US009550475B1

(12) United States Patent
Walker et al.

(10) Patent No.: US 9,550,475 B1
(45) Date of Patent: Jan. 24, 2017

(54) SECURELY DEPLOYING OUTRIGGER FOOT

(71) Applicant: Altec Industries, Inc., Birmingham, AL (US)

(72) Inventors: Elizabeth K. Walker, Wake Forest, NC (US); Benjamin G. Southern, Wake Forest, NC (US)

(73) Assignee: Altec Industries, Inc., Birmingham, AL (US)

(*) Notice: Subject to any disclaimer, the term of this patent is extended or adjusted under 35 U.S.C. 154(b) by 0 days.

(21) Appl. No.: 14/848,950

(22) Filed: Sep. 9, 2015

(51) Int. Cl.
*B60S 9/04* (2006.01)
*B66C 23/78* (2006.01)

(52) U.S. Cl.
CPC . *B60S 9/04* (2013.01); *B66C 23/78* (2013.01)

(58) Field of Classification Search
CPC ........ B60S 9/04; B66C 23/826; B66C 23/821; B66C 23/78
See application file for complete search history.

(56) References Cited

U.S. PATENT DOCUMENTS 3,848,750 A * 11/1974 Hoge .................... B66C 23/905 116/202
3,874,602 A 4/1975 Ciriegio
4,071,147 A * 1/1978 Hornagold .............. B66C 23/80 212/304
4,266,809 A * 5/1981 Wuerflein ............... B66C 23/78 248/677
4,865,094 A 9/1989 Stroud et al.
5,217,126 A * 6/1993 Hayashi ................ B66C 23/905 212/277
5,570,975 A * 11/1996 Reinert, Sr. ............... E02D 7/26 173/184
6,293,479 B1 9/2001 Kaczmarski et al.
6,401,864 B1 6/2002 Stringer et al.
6,811,161 B1* 11/2004 Anderson ................. E06C 5/04 182/19
6,830,204 B1 12/2004 Morey
7,011,124 B1 3/2006 Morey
7,150,472 B1* 12/2006 Schneider ............... B66C 23/80 280/764.1
7,338,077 B2* 3/2008 Richard .................. B66C 23/78 280/763.1

(Continued)

FOREIGN PATENT DOCUMENTS

GB 2368706 A * 5/2002

*Primary Examiner* — Darlene P Condra
(74) *Attorney, Agent, or Firm* — Erise IP, P.A.

(57) ABSTRACT

An outrigger foot is configured to be disposed on an outrigger of a utility vehicle for detecting secure emplacement of the outrigger. The outrigger foot comprises a housing, a kingpin assembly, and a pad assembly. The housing is configured to be secured to the outrigger. The kingpin assembly is at least partially disposed within the housing. The kingpin assembly is adapted to be in a compressed position while the outrigger foot is securely in contact with the ground, and to be in an uncompressed position while the outrigger foot is free of secure contact with the ground. A proximity sensor is associated with the housing, such that the proximity sensor can detect a proximity of a portion of the kingpin assembly that is in the compressed position. The pad assembly is secured to the kingpin assembly for contacting the ground at various angles.

20 Claims, 9 Drawing Sheets

(56) References Cited

U.S. PATENT DOCUMENTS

| | | | | |
|---|---|---|---|---|
| 7,489,098 | B2 * | 2/2009 | Harris | B66C 23/80 212/277 |
| 7,506,405 | B2 * | 3/2009 | Willis | B60B 33/0028 16/47 |
| 7,624,937 | B2 | 12/2009 | Stelter et al. | |
| 7,658,215 | B2 | 2/2010 | Chapman | |
| 8,594,679 | B2 * | 11/2013 | Agarwal | H04W 4/12 455/426.1 |
| 8,757,663 | B1 * | 6/2014 | Glazer | B66C 23/80 280/763.1 |
| 2009/0008917 | A1 * | 1/2009 | Daniel | B60S 9/06 280/766.1 |
| 2011/0062695 | A1 | 3/2011 | Bergemann et al. | |
| 2012/0279938 | A1 * | 11/2012 | Benton | G01B 11/02 212/277 |
| 2013/0074377 | A1 * | 3/2013 | Colbert | E02F 9/085 37/403 |
| 2014/0116975 | A1 * | 5/2014 | Benton | B66C 23/88 212/302 |
| 2014/0231559 | A1 | 8/2014 | Schie | |
| 2015/0030383 | A1 * | 1/2015 | Ukezeki | B60S 9/22 403/316 |
| 2015/0137498 | A1 * | 5/2015 | Klassy | B60S 9/02 280/763.1 |

* cited by examiner

SECURELY DEPLOYING OUTRIGGER FOOT

BACKGROUND

1. Field

Embodiments of the invention relate to the stabilization of aerial devices and other utility vehicles. More specifically, embodiments of the invention relate to a pressure-sensing outrigger foot for an aerial device or other utility vehicle.

2. Related Art

Utility workers utilize aerial devices, cranes, and other utility vehicles to perform numerous tasks. Utility vehicles typically include a boom assembly that aids in performing the task. In the case of an aerial device, the boom assembly supports a utility platform in which one or more utility workers stand. In the case of a crane, the boom assembly lifts and moves heavy loads. In these and other scenarios, a stable utility vehicle is of importance to prevent the tipping.

To achieve stability, many utility vehicles employ outriggers to widen their base and prevent tipping. Outriggers deploy from the base of the utility vehicle and contact the ground. However, outriggers of the prior art present several problems. First, there is no good way to ensure that the outriggers are securely in contact with the ground. Some outriggers of the prior art detect that the outriggers are properly extended, but this does not confirm ground contact. Some outriggers of the prior art detect stresses using a strain gauge, but just because there is strain on the outrigger does not mean that it is securely deployed. Second, outriggers of the prior art require substantially level ground on which to deploy. This can limit the locations in which deployment is possible. Because utility workers must level the ground before deploying outriggers of the prior art, deployments can be time and labor intensive as well as harming the ground.

SUMMARY

Embodiments of the invention solve the above-mentioned problems by providing a securely deploying outrigger foot. The outrigger foot utilizes a proximity sensor to detect that the outrigger foot is securely contacting the ground. A kingpin assembly rises within the outrigger foot upon a secure contact and a proximity sensor detects this rise. The outrigger foot also pivots to wide angles such that the ground need not be level for secure employment.

A first embodiment of the invention is directed to an outrigger foot. The outrigger foot is configured to be disposed on an outrigger of a utility vehicle for detecting secure emplacement of the outrigger. The outrigger foot comprises a housing, a kingpin assembly, and a pad assembly. The housing is configured to be secured to the outrigger. The kingpin assembly is at least partially disposed within the housing. The kingpin assembly is adapted to be in a compressed position while the outrigger foot is securely in contact with the ground, and to be in an uncompressed position while the outrigger foot is free of secure contact with the ground. A proximity sensor is associated with the housing, such that the proximity sensor can detect a proximity of a portion of the kingpin assembly that is in the compressed position. The pad assembly is secured to the kingpin assembly for contacting the ground. The pad assembly is configured to pivot so as to securely contact the ground at various angles.

A second embodiment of the invention is directed to an outrigger. The outrigger is configured to be installed on and deployed by a utility vehicle. The outrigger comprises an elongated outrigger leg, a leg-securing member, an outrigger foot, and a foot-securing member. The elongated outrigger leg presents a proximal end and a distal end. The leg-securing member is for deploying and redeploying the outrigger relative to the utility vehicle. The leg-securing mechanism is disposed at the proximal end of the outrigger leg. The outrigger foot comprises a housing, a kingpin assembly, and a pad assembly. The housing is configured to be secured to the outrigger. The kingpin assembly is at least partially disposed within the housing. The kingpin assembly is adapted to be in a compressed position while the outrigger foot is securely in contact with the ground, and to be in an uncompressed position while the outrigger foot is free of secure contact with the ground. A proximity sensor is associated with the housing, such that the proximity sensor can detect a proximity of a portion of the kingpin assembly that is in the compressed position. The pad assembly is secured to the kingpin assembly for contacting the ground. The pad assembly is configured to pivot so as to securely contact the ground at various angles. The foot-securing member surrounds and secures at least a portion of the housing.

A third embodiment of the invention is directed to a utility vehicle. The utility vehicle comprises a boom assembly for performing a task, a mobile base, and a plurality of outriggers. The plurality of outriggers is secured to the mobile base. Secured to each of the plurality of outriggers is an outrigger foot. The outrigger foot comprises a housing, a kingpin assembly, and a pad assembly. The housing is configured to be secured to the outrigger. The kingpin assembly is at least partially disposed within the housing. The kingpin assembly is adapted to be in a compressed position while the outrigger foot is securely in contact with the ground, and to be in an uncompressed position while the outrigger foot is free of secure contact with the ground. A proximity sensor is associated with the housing, such that the proximity sensor can detect proximity of a portion of the kingpin assembly that is in the compressed position. The pad assembly is secured to the kingpin assembly for contacting the ground. The pad assembly is configured to pivot so as to securely contact the ground at various angles.

Additional embodiments of the invention are directed to a method of assembling an outrigger foot, a method of installing an outrigger foot, and a method of employing outriggers.

This summary is provided to introduce a selection of concepts in a simplified form that are further described below in the detailed description. This summary is not intended to identify key features or essential features of the claimed subject matter, nor is it intended to be used to limit the scope of the claimed subject matter. Other aspects and advantages of the invention will be apparent from the following detailed description of the embodiments and the accompanying drawing figures.

BRIEF DESCRIPTION OF THE DRAWING FIGURES

Embodiments of the invention are described in detail below with reference to the attached drawing figures, wherein.

Figure 1:
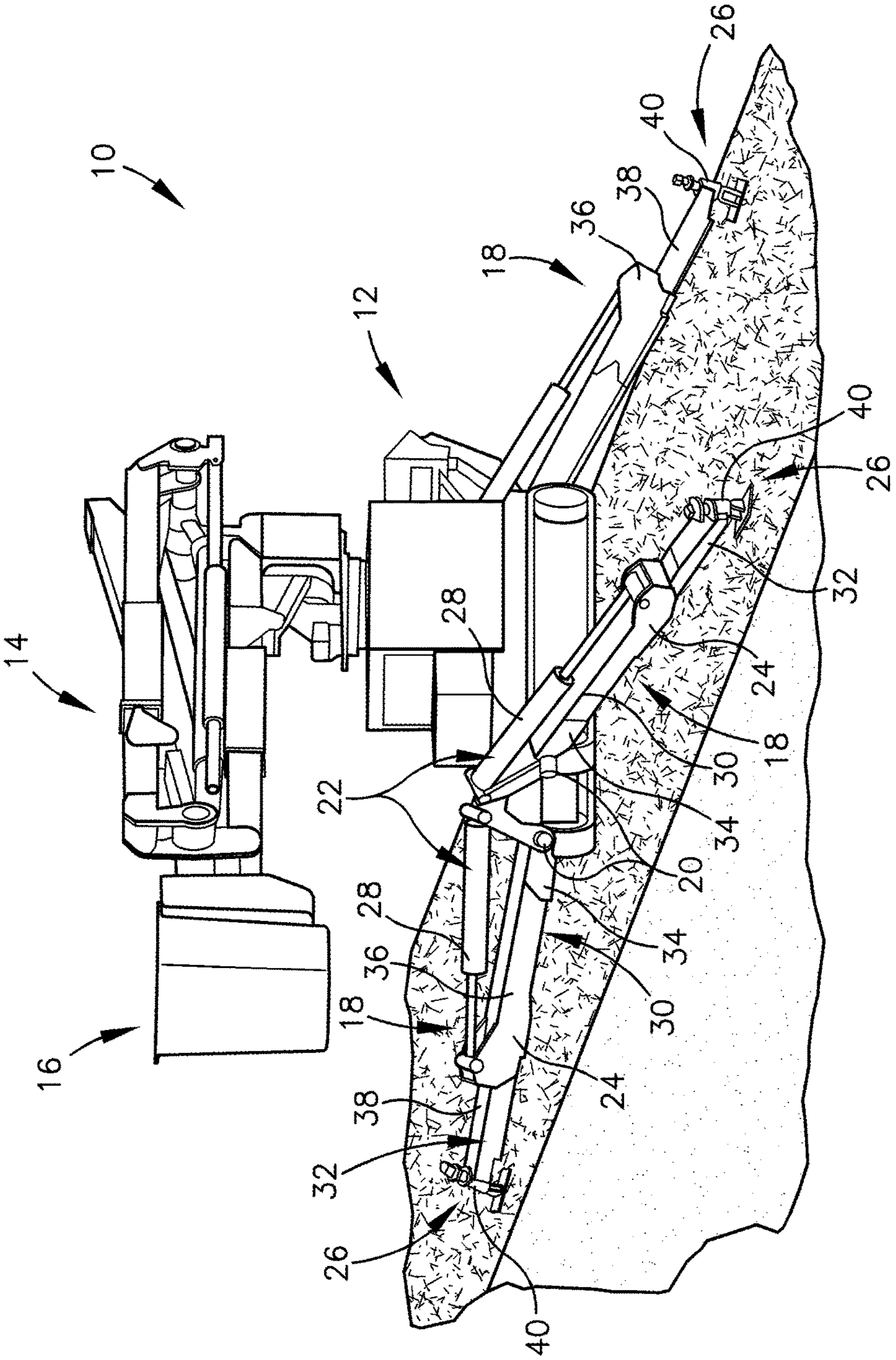
FIG. 1 is an environmental view of a utility vehicle with a boom assembly and a plurality of outriggers.

The drawing figures do not limit the invention to the specific embodiments disclosed and described herein. The drawings are not necessarily to scale, emphasis instead being placed upon clearly illustrating the principles of the invention.

DETAILED DESCRIPTION

The following detailed description references the accompanying drawings that illustrate specific embodiments in which the invention can be practiced. The embodiments are intended to describe aspects of the invention in sufficient detail to enable those skilled in the art to practice the invention. Other embodiments can be utilized and changes can be made without departing from the scope of the invention. The following detailed description is, therefore, not to be taken in a limiting sense. The scope of the invention is defined only by the appended claims, along with the full scope of equivalents to which such claims are entitled.

In this description, references to "one embodiment," "an embodiment," or "embodiments" mean that the feature or features being referred to are included in at least one embodiment of the technology. Separate references to "one embodiment," "an embodiment," or "embodiments" in this description do not necessarily refer to the same embodiment and are also not mutually exclusive unless so stated and/or except as will be readily apparent to those skilled in the art from the description. For example, a feature, structure, act, etc. described in one embodiment may also be included in other embodiments, but is not necessarily included. Thus, the technology can include a variety of combinations and/or integrations of the embodiments described herein.

A utility vehicle 10, constructed in accordance with various embodiments of the invention, is shown in FIG. 1. The utility vehicle 10 generally comprises a base 12 with a boom assembly 14 rotatably mounted thereto. A utility platform 16 or other tool is disposed on the boom assembly 14 to provide for the accomplishment of a task by a utility worker.

The base 12 of the utility vehicle 10 is a selectively stabilized platform. In embodiments of the invention, the base 12 is an aerial device (as illustrated in FIG. 1), a digger derrick, a crane base, an oilrig, an earth-working machine, an automobile, or a fixed structure. The base 12 provides stability and a counterweight to a load being supported by the boom assembly 14. The utility vehicle 10 is typically mobile and moves via wheels and/or tracks rotatably secured to the base 12.

The base 12 of the utility vehicle 10 utilizes at least one outrigger 18 for stabilization. The outriggers 18 typically deploy from within, atop, underneath, or alongside the base 12. The outriggers 18 therefore are configured to be selectively placed into a stowed position and a deployed position. When the outriggers 18 are in the stowed position, the utility vehicle 10 is free to maneuver via the wheels and/or tracks because the outriggers 18 are not in contact with the ground. When the outriggers 18 are in the deployed position, the utility vehicle 10 is prevented from maneuver because the outriggers 18 are in contact with the ground. In some embodiments, the outriggers 18 lift the wheels and/or track at least a portion off of the ground. This further prevents movement of the utility vehicle 10 and provides a more stable platform for the task to be performed. As illustrated in FIG. 1 and further described below, the outriggers 18 may deploy on terrain that is un-level, slanted, or irregular.

In embodiments of the invention, the base 12 includes a plurality of outriggers 18, such as two, three, four, six, eight, etc. In embodiments of the invention, the outriggers 18 are deployed from the base 12 in a shape (when viewed from above) that is substantially X-shaped, H-shaped, etc. Relative to a forward driving direction, the outriggers 18 may deploy forward and backward, to the sides, at some intermediate angle therebetween (such as 30 degrees, 45 degrees, 60 degrees relative to the forward/backward direction), etc. One consideration during the determination of the layout of outriggers 18 relative to the base 12 is the size, shape, and weight distribution of the base 12. For example, if the base 12 is relatively long in the forward direction and relatively thin in the sideways direction, the outriggers 18 may deploy substantially perpendicular to the forward direction (i.e. the sideways direction). This is because the likelihood of the base 12 tipping forward or backward is reduced because of the relative length in the forward direction. A wide base 12 can therefore be achieved via a perpendicular deployment. As another example, if the base 12 is not substantially longer in the forward direction than in the sideways direction, the outriggers 18 may deploy in a diagonal direction relative to the forward direction, in a substantial X-shape when viewed from above. This is because the likelihood of the base 12 tipping forward or backward has not been reduced by the shape of the base 12.

In embodiments of the invention, each outrigger 18 comprises an outrigger-securing mechanism 20, an outrigger-deploying mechanism 22, an outrigger leg 24, and an outrigger foot 26. The outrigger-securing mechanism 20 secures the outrigger to the base 12. The securing may be via a pivot, a recess, or the like. The outrigger-deploying mechanism 22 moves the outrigger 18 from the stowed position to the deployed position. The outrigger-deploying mechanism 22 may operate via a hydraulic cylinder 28, a pneumatic cylinder, an actuator, an electric motor, or the like. The outrigger-deploying mechanism 22 may laterally elongate the outrigger 18 relative to the base 12, elongate the outrigger 18 downward toward the ground, pivot the outrigger 18 relative to the base 12, etc. In some embodiments, the outrigger 18 must be deployed manually by the utility worker. In some embodiments, the outriggers 18 deploy automatically, such as upon a selection by the utility worker to engage the boom assembly 14.

The outrigger leg 24 is elongated so as to increase the stabilized area of the base 12. The outrigger leg 24 presents a proximal end 30 and a distal end 32. At the proximal end 30, the outrigger leg 24 is secured to the base 12 via the outrigger-securing mechanism 20. The outrigger leg 24 may therefore include an attachment segment 34 for receiving the outrigger-securing mechanism 20. Similarly, the outrigger leg 24 may include an attachment segment 34 for receiving the outrigger-deploying mechanism 22. At the distal end 32, the outrigger leg 24 is secured to the outrigger foot 26 for securely interfacing with the ground. In some embodiments, the outrigger leg 24 comprises an outer outrigger leg 36 and at least one telescoping inner outrigger leg 38, such that the outrigger leg 24 increases in length via the telescoping inner outrigger leg 38.

In some embodiments, the outriggers 18 deploy in a direction substantially level with the ground. In these embodiments, the outrigger foot 26 may present a substantially elongated vertical shape, such that the outrigger foot 26 may traverse the distance between the outrigger 18 and the ground. In the industry, these types of outriggers 18 are called "out and down" outriggers. In other embodiments, the outriggers 18 deploy diagonally downward toward the ground, such as illustrated in FIG. 1. In these embodiments, the outrigger foot 26 presents a shortened vertical shape. It should be appreciated that for purposes of clarity in this paragraph, the ground is presumed to be level and flat. In many instances of practical usage, such as illustrated in FIG. 1, the ground is not substantially level. Embodiments of the present invention can accommodate un-level and un-even ground angles, such as up to 10 degrees, up to 20 degrees, up to 30 degrees, up to 45 degrees, etc.

Figure 2:
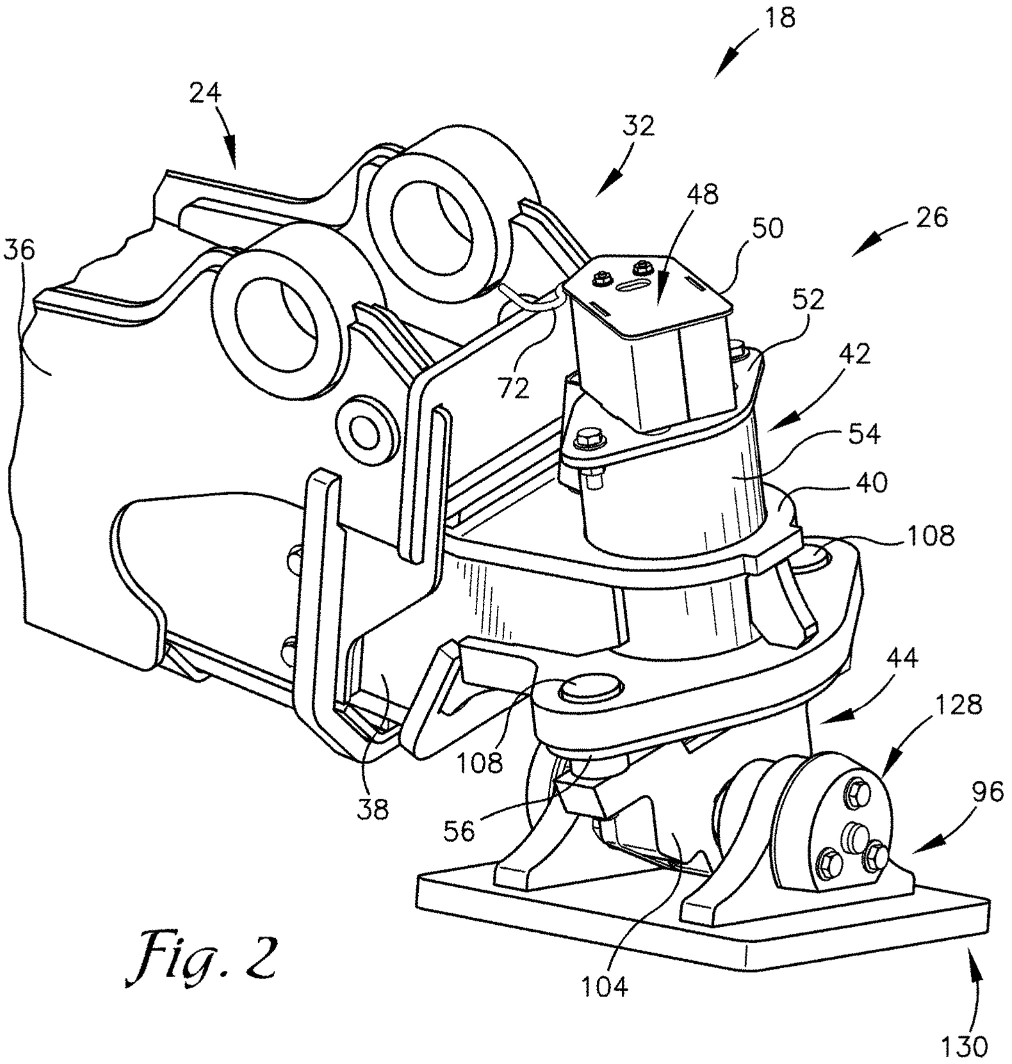
FIG. 2 is a perspective view of a distal end of one of the outriggers of FIG. 1, illustrating an outrigger foot.
Figure 12:
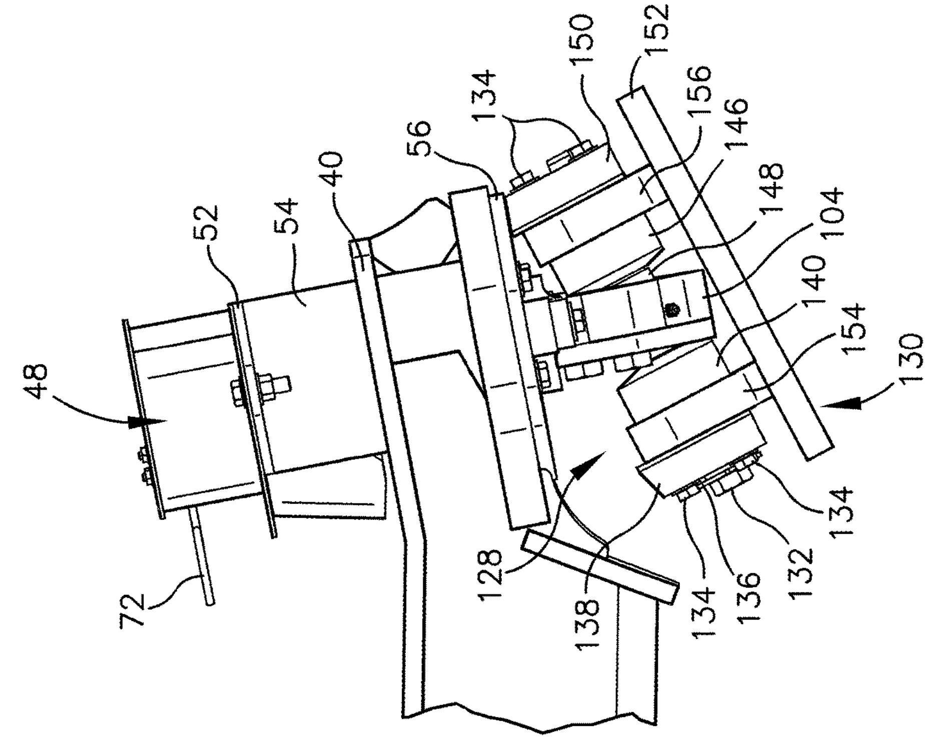
FIG. 12 is a side view of the outrigger foot accommodating an uphill ground angle.
Figure 11:
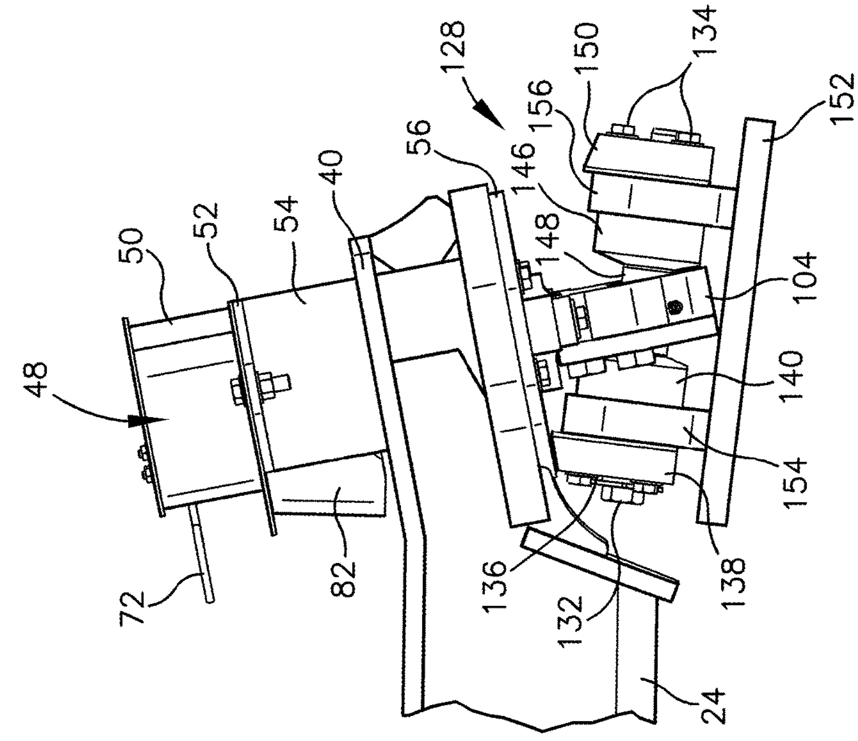
FIG. 11 is a side view of the outrigger foot accommodating a downhill ground angle.

As illustrated in FIG. 2, the outrigger foot 26 is secured to the distal end 32 of the outrigger leg 24. The outrigger leg 24 may therefore present a foot-receptor segment 40 for securing the outrigger foot 26. When installed, the foot-receptor segment 40 is secured around a portion of a housing of the outrigger foot 26, as illustrated in FIGS. 2 and 11-12. The foot-receptor segment 40 ensures that the outrigger foot 26 itself does not pivot relative to the outrigger leg 24. In some embodiments of the invention, the foot-receptor segment 40 pivots so as to accommodate outrigger legs 24 deployed at various angles relative to the base 12 and to the ground.

Figure 3:
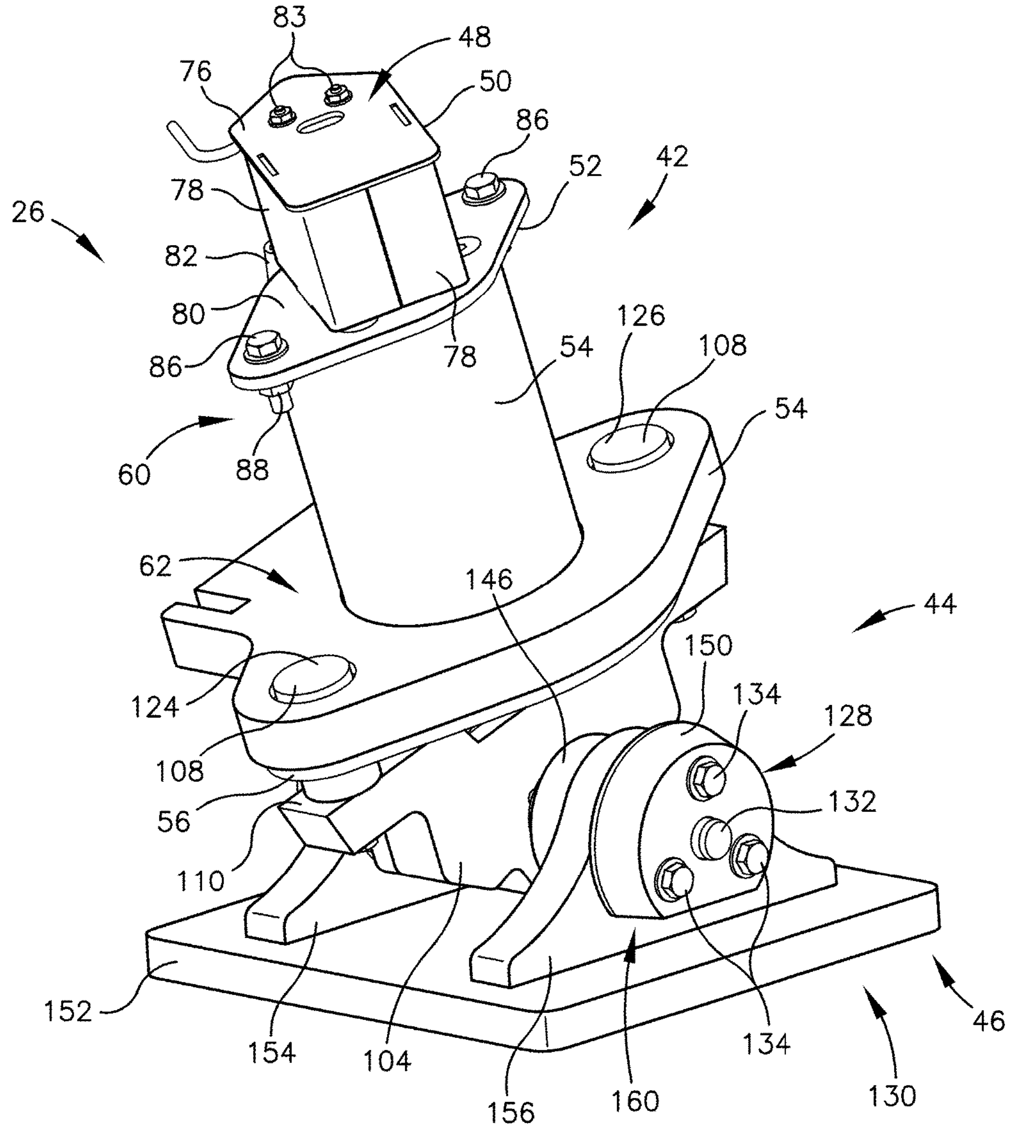
FIG. 3 is a perspective view of the outrigger foot of FIG. 2.

As illustrated in FIG. 3, the outrigger foot 26 broadly comprises a housing assembly 42, a kingpin assembly 44, and a pad assembly 46. The housing assembly 42 is secured at least partially within the foot-receptor segment 40 of the outrigger leg 24. The housing assembly 42 includes a proximity sensor 48 for detecting the secure emplacement. The kingpin assembly 44 is disposed at least partially within the housing assembly 42. As the outrigger foot 26 is emplaced, and pressure is placed on the pad assembly 46 by the ground, the kingpin assembly 44 shifts in an upward direction relative to the housing assembly 42. This upward shift is detected by the proximity sensor 48 as indicative that the outrigger foot 26 has been successfully and safely employed. The pad assembly 46 is disposed below the kingpin assembly 44 so as to interface with the ground upon emplacement. The pad assembly 46 pivots to accommodate un-level and un-even ground.

Figure 4:
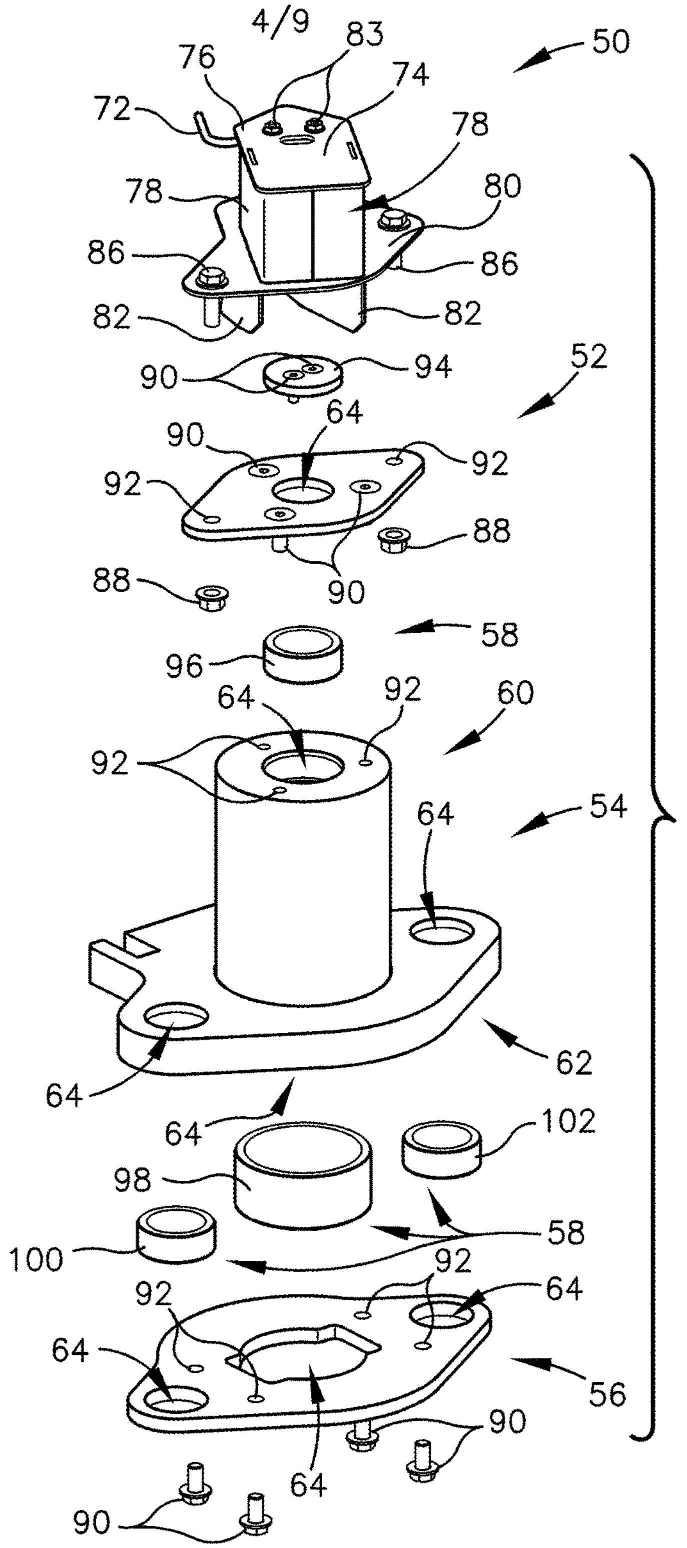
FIG. 4 is an exploded view of a housing of the outrigger foot.

Exemplary components of the housing assembly 42 are illustrated in FIG. 4. In embodiments of the invention, the housing assembly 42 comprises the proximity sensor 48, a cap 50, an upper plate 52, a housing body 54, a lower plate 56, and at least one bearing 58. In embodiments of the invention, the proximity sensor 48 is disposed within the cap 50 and oriented downward. The cap 50 is emplaced atop the upper plate 52. The upper plate 52 is secured to an upper segment 60 of the housing body 54. The lower plate 56 is secured to a lower segment 62 of the housing body 54. The bearings 58 are disposed within a set of kingpin-assembly-receiving openings 64 within the housing body 54 to receive the kingpin assembly 44 therethrough. The housing assembly 42 provides structural support for the outrigger foot 26. The housing assembly 42 also secures and aligns the kingpin assembly 44 within the housing assembly 42.

Figure 5:
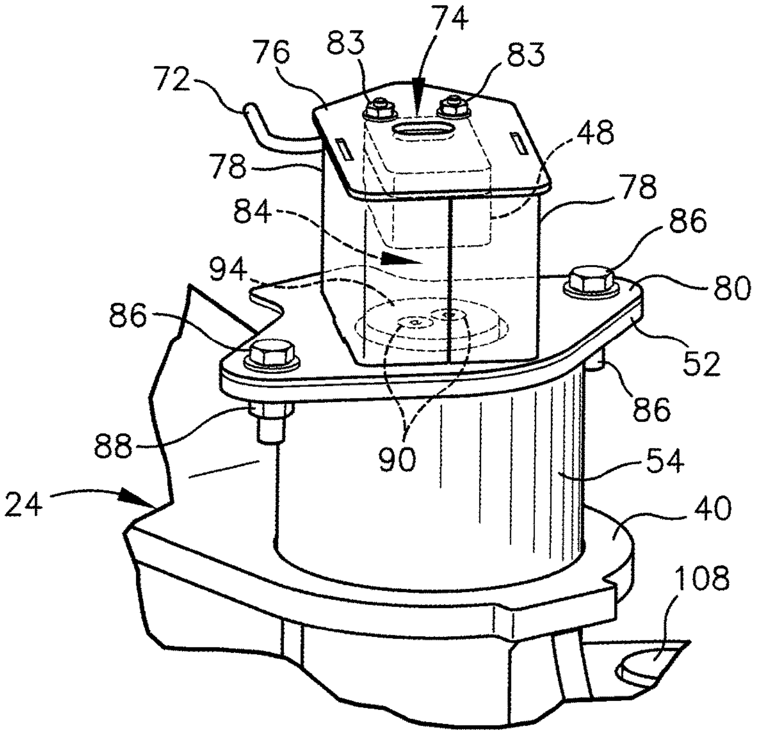
FIG. 5 is a perspective view of a cap of the housing, wherein a kingpin assembly is in an uncompressed position.
Figure 6:
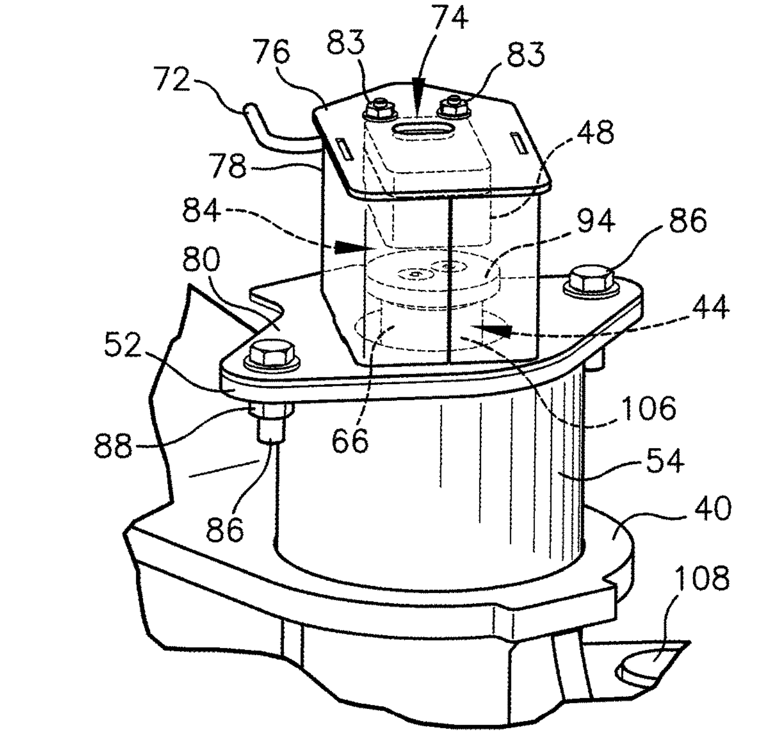
FIG. 6 is a perspective view of the cap of FIG. 5, wherein the kingpin assembly is in a compressed position.
Figure 8:
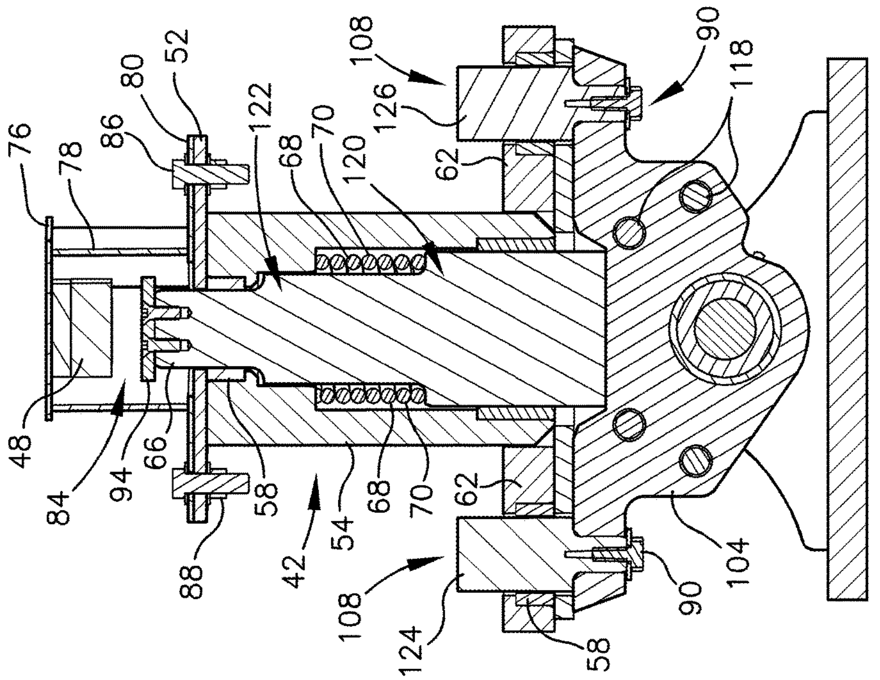
FIG. 8 is a vertical cross-section view of the outrigger foot in the compressed position.
Figure 7:
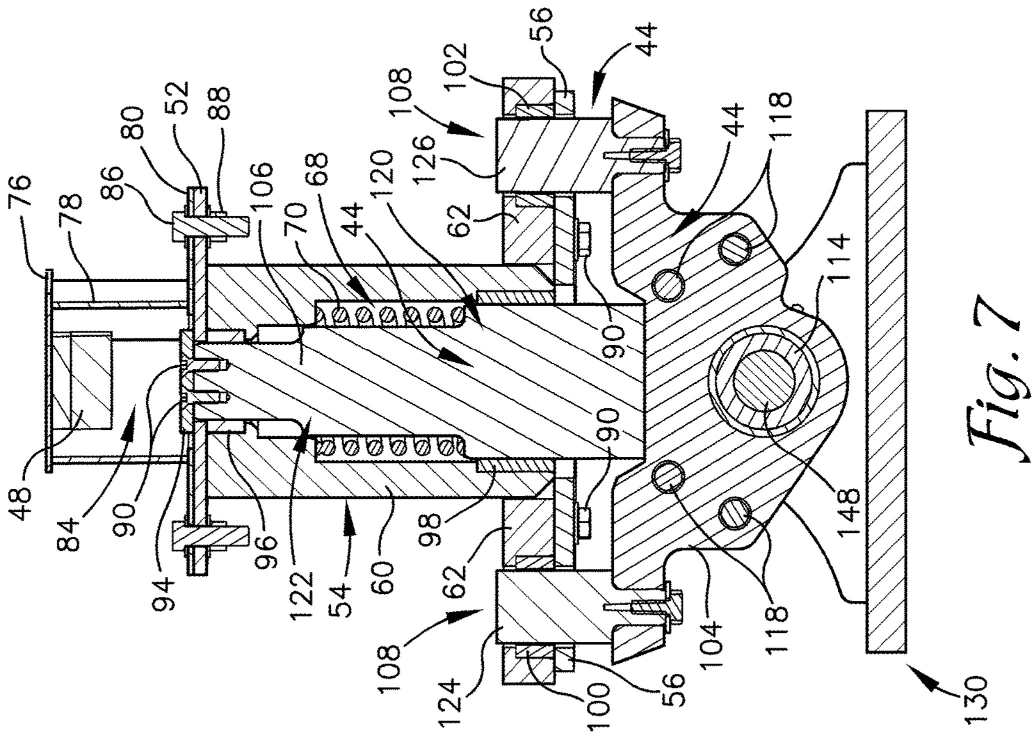
FIG. 7 is a vertical cross-section view of the outrigger foot in the uncompressed position.

The proximity sensor 48 detects a presence of a portion of a head portion 66 of the kingpin assembly 44. Proximity sensors generally detect the presence of other objects without contact. In some embodiments of the invention, the proximity sensor 48 emits a field or beam of electromagnetic radiation, such as infrared. The proximity sensor also detects changes in the electromagnetic field or return signal of the electromagnetic beam. Typically, the proximity sensor 48 will have a long lifespan due to a lack of mechanical components and a lack of physical contact with other objects. As discussed further below, there are at least two positions of the kingpin assembly 44 within the housing assembly 42. In an uncompressed position, such as illustrated in FIGS. 5 and 7, the pad assembly 46 is not in contact with the ground and as such the kingpin assembly 44 is not being pushed upward. In some embodiments, the kingpin assembly 44 is in fact being pushed downward by an actuator 68 such as a spring 70. In a compressed position, such as illustrated in FIGS. 6 and 8, the pad assembly 46 is securely in contact with the ground so as to raise the kingpin assembly 44 relative to the housing assembly 42. The force applied by the actuator 68 is overcome to force the kingpin assembly 44 up.

In embodiments of the invention, the proximity sensor 48 can detect the presence of the kingpin assembly 44 only so long as the outrigger foot 26 is securely in contact with the ground. When in the uncompressed position, the proximity sensor 48 cannot detect the presence of the kingpin assembly 44. The proximity sensor 48 will detect the presence of the kingpin assembly 44 upon the passing of a certain threshold distance upward so as to constitute the compressed position. In other embodiments, the proximity sensor 48 can detect the presence of the kingpin assembly 44 regardless of the position and can calculate a distance between the proximity sensor 48 and the kingpin assembly 44. The proximity sensor 48 then detects that the kingpin assembly 44 is in the compressed position based upon the calculated distance.

In embodiments of the invention, the proximity sensor 48 is communicatively coupled with a control system of the utility vehicle 10. The control system may initiate the deployment of the outriggers 18 via the outrigger deployment mechanism. The control system then awaits information from the proximity sensor 48 that is indicative of the detection of the compressed position of the kingpin assembly 44. The information may be of a Boolean data type (such as proper emplacement is either "true" or "false") or of a numerical data type (such as the detected distance between the kingpin assembly 44 and the proximity sensor 48, or a percentage of full emplacement), or both.

In some embodiments, the control system determines whether the utility vehicle 10 is stable to perform operations based upon an analysis of all of the outriggers 18 for that utility vehicle 10. For example, if three of the outriggers 18 are fully employed and one is 75% employed, the control system may determine that this is sufficiently stabilized to perform operations. In making this analysis, the control system may also consider an angle of the utility vehicle 10 relative to true level, the type of ground upon which the outriggers 18 are deployed (e.g. concrete, grass, dirt, etc.), the expected type of operation to be performed, the expected weights and angles of the boom assembly 14 that will be necessary to perform the operation, the expected duration of the operation, the presence of other secondary stabilization devices (such as sandbags, weights, etc.), and the like. It should be appreciated that several of these information types may require input from the utility worker or a dispatcher. In other embodiments, utility worker input is not received due to the potential for misuse by utility workers.

The control system may continue to monitor the proximity sensors 48 of the various outriggers 18. Because of changing conditions during operations, a utility vehicle 10 that is initially sufficiently stable for safe operations may cease to be so. The proximity sensor 48 may therefore continue to function during the operation. Examples of changing conditions during the operation include the angle of the boom assembly 14, the weight supported, and the stability of the ground under the pad assembly 46. Upon a detection of a loss of stability by the control system, the control system may take or recommend that the utility worker take mitigating actions to prevent a catastrophic collapse of the utility vehicle 10. For example, if the utility vehicle 10 is repairing a power line along a road side, the ground may eventually give way to the pressure exerted on it by the outrigger feet 26. Upon detecting this, the control system may sound an alarm to the utility worker advising immediate cease of operations and lowering of the boom assembly 14. The control system may also automatically lower and/or retract the boom assembly 14 upon the detection of a tipping motion by the utility vehicle 10. While automatic lowering of the boom assembly 14 may be typically unsafe because the control system is not aware of the other objects in the immediate area, a detected tipping motion may be considered more important to prevent in an emergency.

In some embodiments, the cap 50 includes an antenna 72 to facilitate the communication between the proximity sensor 48 and the control system. the communication is accomplished via a wireless communication protocol and power is provided to the proximity sensor 48 via an internal battery. In other embodiments, the cap 50 may also include a cable that provides power and or communications to the proximity sensor 48 and thus is connected to a central electrical system and/or control system of the utility vehicle 10.

In some embodiments, the proximity sensor 48 is not communicatively coupled to the control system, but instead provides an indication to the utility worker as to the position of the kingpin assembly 44. These indications could be audio, visual, or the like. As one example, as the outrigger 18 begins to deploy, a red light is illuminated atop the cap 50. Once the proximity sensor 48 detects that the kingpin assembly 44 is in the compressed position, a green light is illuminated instead of the red light (may be the same light or two adjacent lights). Once the utility worker observes all outriggers 18 displaying the green light, the utility worker knows that it is safe to begin operations. As another example, as the outrigger 18 begins deploying an audible signal is produced by a speaker associated with the proximity sensor 48 of each outrigger 18. Upon the proximity sensor 48 detecting the compressed position, the speaker ceases the audible signal. Once the utility worker no longer hears any audible signals, the utility worker knows that it is safe to begin operations. In still other embodiments, the utility vehicle 10 detects these audio and/or visual signals and prevents operation until the utility vehicle 10 is safely stabilized.

The cap 50 of the housing assembly 42 provides a securement point 74 for the proximity sensor 48 to the housing assembly 42. In some embodiments of the invention, the cap 50 comprises a top wall segment 76, at least one sidewall segments 78, a securing wall segment 80, and at least one stabilizing wall segment 82. The cap 50 is secured to the upper segment 60 of the housing assembly 42, such as atop the upper plate 52 and/or the housing body 54.

In embodiments of the invention, the proximity sensor 48 is secured to the top wall segment 76 and oriented downward, as discussed above. The proximity sensor 48 is secured via the use of a set of proximity sensor fasteners 83. In other embodiments, the proximity sensor 48 is secured to one of the sidewall segments 78 and oriented laterally. For example, the proximity sensor 48 may include an IR transmitter and an IR receiver disposed on opposing sidewall segments 78. As the kingpin assembly 44 rises to the compressed position, the kingpin assembly 44 blocks the transmission of IR energy between the IR transmitter and the IR receiver. This blocked transmission is then detected by the IR receiver as an indication that the kingpin assembly 44 is in the compressed position.

The top wall segment 76 and the at least one sidewall segment 78 present a void 84 into which the kingpin assembly 44 rises in the compressed position. The securing wall segment 80 extends from a portion of the at least one sidewall segment 78 to allow the cap 50 to be secured to the other components of the housing assembly 42. In embodiments of the invention, a set of cap fasteners 86 extend through the securing wall segment 80, through the upper plate 52, and through a set of cap fastener washers 88. The stabilizing wall segment 82 descends below the securing wall segment 80 to provide contact the housing body 54 of the housing assembly 42. Because the cap 50 is relatively susceptible to damage, the stabilizing wall segment 82 reduces the effects of impacts or other sheering forces applied to the cap 50 during operation.

The housing body 54 of the housing assembly 42 presents at least one kingpin-assembly-receiving opening 64 for receipt of the kingpin assembly 44. As illustrated in FIGS. 3 and 7-8, the housing body 54 may present an upside-down T-shape when viewed from the side. The housing body 54 may include the actuator 68, such as the spring 70, disposed within. The spring 70 applies a force against the kingpin assembly 44 that drives the kingpin assembly 44 into the uncompressed position (along with the force of gravity). As illustrated in FIGS. 7-8, the spring 70 is disposed within one of the kingpin-assembly-receiving openings 64 of the housing body 54 and the kingpin assembly 44 passes through the middle of the spring 70. In other embodiments, other actuators are used to impart the downward force on the kingpin assembly 44. These other actuators could be hydraulic cylinders, pneumatic cylinders, electric motors, etc.

In embodiments of the invention upper plate 52 of the housing assembly 42 is disposed between the housing body 54 and the cap 50. The upper plate 52 receives a set of fasteners 90 from the securing wall segment 80 of the cap 50. The upper plate 52 also receives a set of fasteners 90 to secure the upper plate 52 to the housing body 54. The upper plate 52 therefore presents a plurality of fastener receptors 92 for the receipt of the various fasteners 90. The upper plate 52 also presents a kingpin-passing opening through which a portion of the kingpin assembly 44 passes so as to enter the void 84 of the cap 50.

In embodiments of the invention, the housing assembly 42 further comprises a retaining plate 94 that is installed via fasteners 90 atop the head portion 66 of the kingpin assembly 44 after the kingpin assembly 44 is inserted into the housing body 54 (discussed below). The retaining plate 94 presents a cross-section larger than the kingpin-passing opening in the upper plate 52. Once installed, the retaining plate 94 prevents the kingpin assembly 44 from falling back out of the lower segment 62 of the housing assembly 42. The utility of the retaining plate 94 is best illustrated in FIGS. 5-8. As can be seen, in the uncompressed position (FIGS. 5 and 7), the retaining plate 94 is disposed adjacent to the upper plate 52. When in the compressed position (FIGS. 6 and 8), the retaining plate 94 is elevated atop the upper plate 52. As such, the proximity sensor 48 is detecting the presence of the retaining plate 94.

The lower plate 56 of the housing assembly 42 is disposed below the housing body 54. In embodiments of the invention, the lower plate 56 is secured to the housing body 54 by a set of fasteners 90. Like the upper plate 52, the lower plate 56 presents a kingpin-passing opening. Because, as discussed below, the kingpin assembly 44 may present a cylindrical stepped pyramid shape, the kingpin-passing opening of the lower plate 56 may be of a larger diameter (or of a larger area) than the kingpin-passing opening of the upper plate 52. As illustrated in FIG. 4, the lower plate 56 may also include at least one opening for the passing of anti-rotation pins of the kingpin assembly 44 (discussed below).

Because they are often placed into direct and stressful contact with the kingpin assembly 44, the upper plate 52 and the lower plate 56 of the housing assembly 42 are configured to be easily uninstalled and replaced upon damage.

In embodiments of the invention, the housing assembly 42 further comprises a plurality of bearings 58. In one embodiments, the bearings 58 include an upper kingpin bearing 96, a lower kingpin bearing 98, a first anti-rotation bearing 100, and a second anti-rotation bearing 102. Once installed, the bearings 58 are retained within the housing body 54 of the housing assembly 42 by the upper plate 52 or the lower plate 56. The bearings 58 allow for the kingpin assembly 44 to smoothly travel through the housing body 54 without seizing or generating heat through excessive friction. The upper kingpin bearing 96 is disposed in the upper segment 60 of the housing body 54 and retained therein by the upper plate 52. The lower kingpin bearing 98 is disposed in the lower segment 62 of the housing body 54 and retained therein by the lower plate 56. The first anti-rotation bearing 100 and the second anti-rotation bearing 102 are also disposed in the lower segment 62 of the housing body 54 and retained therein by the lower plate 56.

The kingpin assembly 44 is partially disposed within the housing assembly 42. The kingpin assembly 44 provides an indication that the pad assembly 46 is securely in contact with the ground. The kingpin assembly 44 overcomes the force of the actuator 68 associated with the housing assembly 42. Overcoming this force is indicative that the outrigger foot 26 has sufficient strength to stabilize the utility vehicle 10.

The kingpin assembly 44 broadly comprises a base member 104, a kingpin 106, and at least one anti-rotation pin 108. The kingpin 106 and the anti-rotation pins 108 extend substantially vertically from the base member 104. The base member 104 provides a foundation for the kingpin 106 and the anti-rotation pins 108. It should be noted that the kingpin 106 and the anti-rotation pins 108 remain substantially vertical regardless of the angle of the ground, due to the pivoting of the pad assembly as discussed below.

Figure 9:
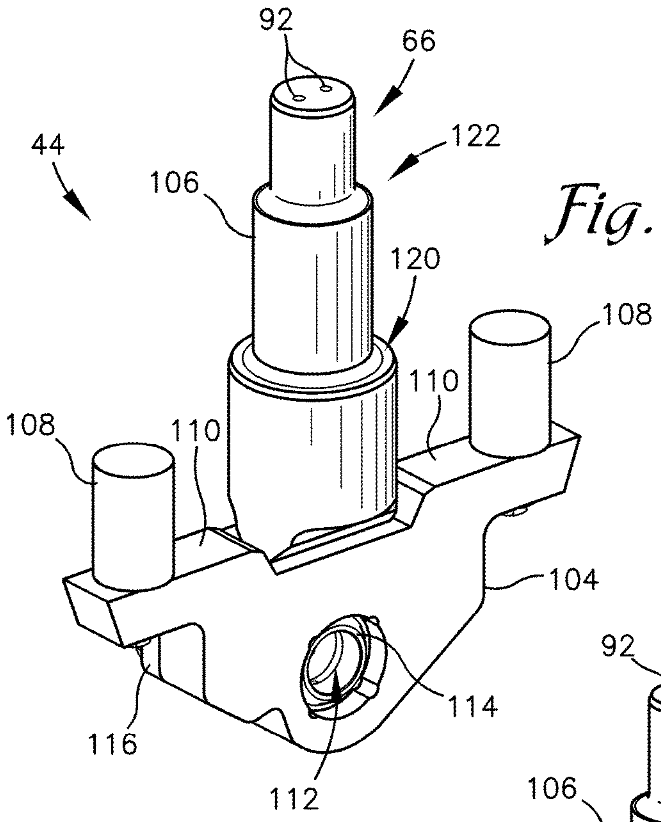
FIG. 9 is a perspective view of the kingpin assembly.
Figure 10:
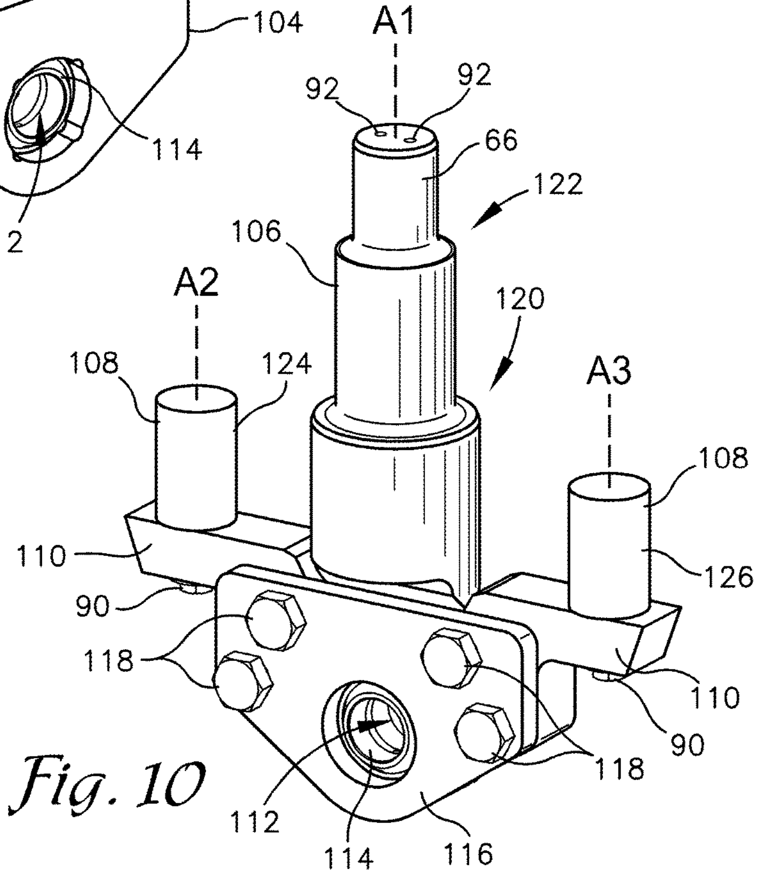
FIG. 10 is another perspective view of the kingpin assembly.

The base member 104 is disposed below the housing assembly 42. When the kingpin assembly 44 is in the compressed position, an upper portion 110 of the base member 104 is in contact with a lower portion of the housing assembly 42. At least a portion of the weight emplaced on the outrigger 18 (i.e. from the utility vehicle 10) is supported by the base member 104. The base member 104 also presents a traversing rod opening 112 with a misalignment bearing 114 disposed therein. The traversing rod opening 112 receives a portion of the pad assembly 46 (as discussed below) and the misalignment bearing 114 allows the pad assembly 46 to in all or substantially all directions. As can be seen in FIGS. 9 and 10, the traversing rod opening 112 extends laterally (as opposed to vertically, in which the kingpin-assembly-receiving openings 64 of the housing are oriented).

In some embodiments, the base member 104 includes a side plate 116 and a set of side plate fasteners 118. The side plate 116 is removed so as to allow the misalignment bearing 114 to be inserted. Once the misalignment bearing 114 is inserted, the side plate 116 is installed via the fasteners 118 over the misalignment bearing 114. This prevents the misalignment bearing 114 from slipping or falling out of the base member 104.

The kingpin 106 rises vertically from the base member 104. In embodiments of the invention, the kingpin 106 presents a cylindrical step pyramid shape, as best illustrated in FIGS. 9 and 10. The cylindrical step pyramid shape may present a lower step 120 and an upper step 122. As best illustrated in FIGS. 7 and 8, the lower step 120 interfaces with the spring 70 within the housing assembly 42, such that the spring 70 exerts the above-discussed force on the lower step 120. When in the compressed position, the upper step 122 supports the weight of the housing assembly 42 (and therefore the weight of at least a portion of the utility vehicle 10).

The kingpin 106 may also present at least one fastener receptor 92 for receiving the fasteners associated with the retaining plate 94. As discussed above, in embodiments of the invention, the retaining plate 94 is a component of the housing assembly 42 that is installed atop the kingpin assembly 44 (after the kingpin 106 is inserted into the housing assembly 42) to retain the kingpin 106 and prevent it from falling out the lower segment 62 of the housing assembly 42.

In embodiments of the invention, the kingpin assembly 44 presents at least one anti-rotation pin 108. The anti-rotation pins 108 prevent unwanted rotation of the kingpin 106 within the housing assembly 42. This unwanted rotation could include all three degrees of rotational freedom (yaw, roll, and pitch, discussed more below), or a combination thereof. The anti-rotation pins 108 therefore keep the kingpin 106 aligned with the housing assembly 42. The anti-rotation pins 108 maintain the alignment of the outrigger foot 26 relative to the outrigger 18, so that the outrigger foot 26 has the ability to set up on the specified ground angle without having to turn it manually (such as by the operator). The outrigger foot 26 has more rotational freedom in some directions than others, which causes it to bottom out early if misaligned. If misaligned, the outrigger foot 26 will not sit on the ground flat.

One embodiment of the layout of the anti-rotation pins 108 is illustrated in FIGS. 9 and 10. As shown the anti-rotation pins 108 rise from the base member 104 approximately 25 percent of the height of the kingpin assembly 44. In other embodiments, the anti-rotation pins 108 may rise from 10-40 percent of the height of the kingpin 106. In some embodiments, more or fewer anti-rotation pins 108 may be used. For example, a single anti-rotation pin 108 would provide many of the benefits of two anti-rotation pins 108. As another example, three anti-rotation pins 108 assembled in a triangular configuration (when viewed from above)

In embodiments of the invention, the kingpin 106, a first anti-rotation pin 124, and a second anti-rotation pin 126 are aligned such that they are coplanar and along parallel axes. The kingpin 106 is aligned along an axis A1, as illustrated in FIG. 10. The first anti-rotation pin 124 is aligned along an axis A2. The second anti-rotation pin 126 is aligned along an axis A3. A1, A2, and A3 are substantially coplanar and parallel with each other. A1, A2, and A3 also extend in a substantially upward direction from (and through) the base member 104. In embodiments of the invention, when viewed from the side the base member 104, the kingpin 106, the first anti-rotation pin 124, and the second anti-rotation pin 126 overall W-shape.

In other embodiments of the invention the kingpin 106 and/or anti-rotation pins 108 present a shape about horizontal cross-section other than a circle (as illustrated in the figures). For example, this shape at horizontal cross section may be an ellipse, a triangle, a square, a quadrilateral, a pentagon, a hexagon, etc. In some embodiments, these shapes at horizontal cross-section reduce the need for anti-rotation pins 108 because they provide some of the same benefits thereof.

The pad assembly 46 of the invention interfaces with the ground so as to provide a stable platform from which the utility worker will perform the various operations. The pad assemblies 46 of the various outriggers 18 therefore work together to provide stability across the utility vehicle 10. In embodiments of the invention, the pad assembly 46 pivots in many directions so as to accommodate ground contact at many different angles. The pad assembly 46 of the outrigger foot 26 can accommodate downhill angles (as illustrated in FIG. 11), uphill angles (as illustrated in FIG. 12), and cross angles (as illustrated in FIG. 3).

Figure 13:
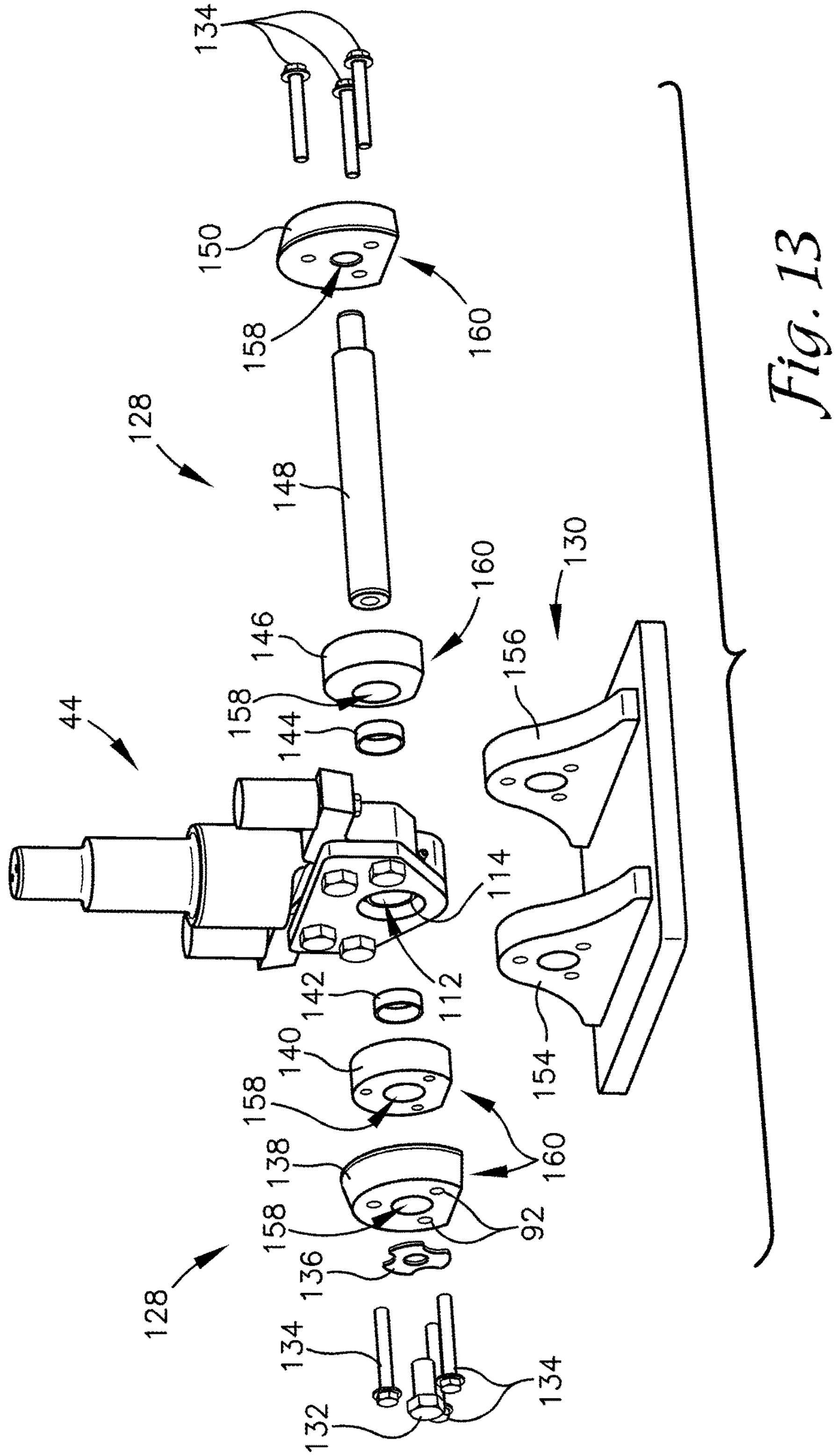
FIG. 13 is an exploded view of the pad assembly of the outrigger foot, with the kingpin assembly included for positional reference.

As illustrated in FIGS. 11-13, the pad assembly 46 comprises a pad pivot 128 and a pad 130. The pad pivot 128 is assembled around and through the kingpin assembly 44 as shown. The pad pivot 128 accommodates the pivoting action of the pad assembly 46, and also provides stops to prevent to prevent excessive pivoting of the pad 130. The pad 130 is secured to the pad pivot 128 and actually interfaces with the ground.

In embodiments of the invention, the pad pivot 128 comprises (as illustrated in FIG. 13 from left to right) a traversing rod fastener 132, a plurality of endcap fasteners 134, a rod washer 136, a first endcap 138, a first spacer 140, a first rod spacer 142, a second rod spacer 144, a second spacer 146, a traversing rod 148, and a second endcap 150. In embodiments of the invention, the pad 130 comprises a pad plate 152, a first pad protrusion 154, and a second pad protrusion 156. The pad assembly 46 provides pivoting in many, substantially all, or all directions based upon the combinations of at least two pivoting actions. The first pivoting action is accomplished via the misalignment bearing 114 within the kingpin assembly 44. The first pivoting action allows the pad assembly 46 to conform to ground that is presenting an downhill orientation relative to the outrigger 18 (see FIG. 11) and a downhill orientation relative to the outrigger 18 (see FIG. 12). The second pivoting action is accomplished via the first rod spacer 142 and the second rod spacer 144 within the pad assembly 46. The second pivoting action allows the pad assembly 46 to conform to ground that is presenting a cross incline (see FIG. 3). In embodiments of the invention, the amount of uphill, downhill, and cross incline that the outrigger foot 26 will accommodate is based upon the size, shape, and weight of the utility vehicle 10. The maximum load weight that can be support, maximum reach of the boom assembly, and the types of operations for which the utility vehicle is adapted may also be considered.

The traversing rod 148 is disposed through the misalignment bearing 114 of the kingpin assembly 44. The misalignment bearing 114 facilitates cross-axial pivoting of the traversing rod 148. In embodiments of the invention, the first rod spacer 142 and the second rod spacer 144 are disposed against the misalignment bearing 114 to facilitate the pivoting, within the respective spacers, within the respective pad protrusions, etc. The first rod spacer 142 and second rod spacer 144 facilitate axial pivoting of the traversing rod 148. Via a combination of cross-axial and axial pivoting, the pad assembly 46 can accommodate a wide range of ground angles.

As best illustrated in FIGS. 11 and 12, the first spacer 140 and the second spacer 146 are disposed between the kingpin assembly 44 and the set of pad protrusions 154, 156. The first spacer 140 and the second spacer 146 present shape that is substantially cylindrical having the traversing rod opening 112 therethrough being the same or slightly larger than a diameter presented by the traversing rod 148. The first spacer 140 and the second spacer 146 may also present a set of fastener receptors 92 for the receipt of fasteners that are passed through the respective endcaps and the respective pad protrusions.

The first endcap 138 and the second endcap 150 are secured to first pad protrusion 154 and the second pad protrusion 156, respectively. In some embodiments of the invention, the first endcap 138, the first spacer 140, the second spacer 146, and the second endcap 150 may present a flat side 158. The flat side 158 allows the respective component to be installed without striking the pad plate 152. In other embodiments of the invention, the above-mentioned components are fully cylindrical due to the respective sizes of the components. As best illustrated in FIGS. 11 and 12, the first endcap 138 and the second endcap 150 may present an angled exterior surface, such that the first endcap 138 and the second endcap 150 can rest against the lower plate 56 when the outrigger foot 26 is in the fully uphill or fully downhill position. This allows the lower plate 56 to securely stabilize the pad assembly 46 without damaging the first or second endcap 138, 150.

In embodiments of the invention, the traversing rod 148 is secured within the second endcap 150 and traverses an opening through each of the second pad protrusion 156, the second spacer 146, the misalignment bearing 114 of the kingpin assembly 44, the first spacer 140, the first pad protrusion 154, and the first endcap 138. The rod washer 136 is then disposed on the first endcap 138 and the traversing rod fastener 132 is secured into a fastener receptor 92 of the traversing rod 148. The traversing rod fastener 132 and the plurality of endcap fasteners 134 ensure that the pad assembly 46 is secured and can pivot as described above.

The pad plate 152 of the pad 130 is secured below the pad protrusions for contacting the ground. In embodiments of the invention, the pad plate 152 presents a shape that is substantially a rectangular prism. In other embodiments, the pad plate 152 presents a cylindrical shape, an elliptical prism shape, a triangular prism shape, etc. In embodiments of the invention, the pad plate 152, the first pad protrusion 154 and the second pad protrusion 156 are monolithic.

In embodiments of the invention, the various components of the outrigger foot 26 are formed of a metal to provide structural stability and strength. In other embodiments of the invention, the various components of the outrigger foot 26 are formed of a hardened polymer to provide dielectric qualities to prevent the unintended discharge of electricity through the outrigger foot 26. In still other embodiments of the invention, some components of the outrigger foot 26 are formed of metal and other components of the outrigger foot 26 are formed of a hardened polymer, so as to provide structural support while providing dielectric properties.

Various methods of the invention will now be discussed. A method of assembling the outrigger foot 26 comprises the following steps: installing the kingpin 106, the first anti-rotation pin 124, and the second anti-rotation pin 126 into the base member 104 of the kingpin assembly 44; inserting the misalignment bearing 114 into the base member 104; installing the side plate 116 of the base member 104; securing (such as by welding) the second endcap 150 to the traversing rod 148; aligning the first endcap 138, the first pad protrusion 154, and the first spacer 140; inserting and securing the plurality of endcap fasteners 134 through the first endcap 138, the first pad protrusion 154, and the first spacer 140; inserting the traversing rod 148 though the second pad protrusion 156 and the second spacer 146; inserting and securing the plurality of endcap fasteners 134 through the second endcap 150, the second pad protrusion 156, and the second spacer 146; aligning the misalignment bearing 114 within kingpin assembly 44 with the opening presented by the pad assembly 46; inserting the traversing rod 148 through the misalignment bearing 114; securing the traversing rod 148 with the rod washer 136 and the traversing rod fastener 132; inserting the kingpin assembly 44 into the housing assembly 42; installing the retaining plate 94 atop the kingpin assembly 44; and installing the cap 50 onto the upper segment 60 of the housing assembly 42.

A method of deploying an outrigger foot 26 includes instructing an outrigger 18 to deploy; receiving information indicative that the outrigger 18 has fully deployed; and receiving information indicative that the proximity sensor 48 has detected that the kingpin assembly 44 is in the compressed position.

Although the invention has been described with reference to the embodiments illustrated in the attached drawing figures, it is noted that equivalents may be employed and substitutions made herein without departing from the scope of the invention as recited in the claims.

Having thus described various embodiments of the invention, what is claimed as new and desired to be protected by Letters Patent includes the following:

1. An outrigger foot configured to be disposed on an outrigger of a utility vehicle for detecting secure emplacement of the outrigger, the outrigger foot comprising:
- a housing configured to be secured to the outrigger;
- a kingpin assembly at least partially disposed within the housing,
- said kingpin assembly adapted to be in a compressed position while the outrigger foot is securely in contact with the ground,
- said kingpin assembly adapted to be in an uncompressed position while the outrigger foot is free of secure contact with the ground;
- a proximity sensor associated with the housing such that the proximity sensor can detect a proximity of a portion of the kingpin assembly that is in the compressed position,
- wherein the kingpin assembly being in the compressed position is indicative that the outrigger foot is securely in contact with the ground; and
- a pad assembly secured to the kingpin assembly for contacting the ground.

2. The outrigger foot of claim 1, wherein the proximity sensor is communicatively coupled with a control system of the utility vehicle such that the utility vehicle will prevent at least one operation of the utility vehicle until the proximity sensor detects that the kingpin assembly is in the compressed state.

3. The outrigger foot of claim 1, wherein the housing comprises:
- a housing body presenting at least one opening for receipt of the kingpin assembly;
- a lower plate for preventing the kingpin assembly from moving beyond the compressed position;
- an upper plate for preventing the kingpin assembly from moving beyond the uncompressed position,
- wherein the upper plate and the lower plate secure at least a portion of the kingpin assembly within at least a portion of the housing.

4. The outrigger foot of claim 3, wherein the housing comprises:
- a cap disposed above the upper plate,
- wherein the proximity sensor is secured within the cap and oriented downward.

5. The outrigger foot of claim 4,
- wherein a portion of the kingpin assembly is disposed above a plane presented by the upper plate while the kingpin assembly is in the compressed position,
- wherein the cap presents a void and a portion of the kingpin assembly is disposed within the void while the kingpin assembly is in the compressed position.

6. The outrigger foot of claim 1, wherein the kingpin assembly includes—
- a base member;
- a kingpin secured to the base member and oriented vertically along a first axis;
- a first anti-rotation pin secured to the base member and oriented vertically along a second axis; and
- a second anti-rotation pin secured to the base member and oriented vertically along a third axis,
- wherein the first axis, the second axis, and the third axis are all substantially parallel and substantially coplanar,
- wherein the first anti-rotation pin and the second anti-rotation pin keep the kingpin aligned with the housing.

7. The outrigger foot of claim 6, wherein the base member, the kingpin, the first anti-rotation pin, and the second anti-rotation pin present a substantial W shape when viewed from a side angle.

8. The outrigger foot of claim 1,
- wherein the kingpin assembly presents an opening,
- wherein the pad assembly is secured to the kingpin assembly via a traversing rod disposed at least partially within the opening.

9. The outrigger foot of claim 8, further comprising:
- a misalignment bearing disposed at least partially within said opening,
- wherein the misalignment bearing allows the pad assembly to conform to a ground angle,
- wherein the traversing rod is disposed within the misalignment bearing such that a rising of the traversing rod corresponds to a rising of the kingpin assembly into the compressed position.

10. An outrigger configured to be installed on and deployed by a utility vehicle, the outrigger comprising:
- an elongated outrigger leg presenting a proximal end and a distal end;
- a leg-securing member for deploying and redeploying the outrigger relative to the utility vehicle wherein the leg-securing mechanism is disposed at the proximal end of the outrigger leg; and an outrigger foot disposed at the distal end of the outrigger leg, the outrigger foot including— a housing secured to the outrigger;

a kingpin assembly at least partially disposed within the housing, said kingpin assembly adapted to be in a compressed position while the outrigger foot is securely in contact with the ground, said kingpin assembly adapted to be in an uncompressed position while the outrigger foot is not securely in contact with the ground;

a proximity sensor associated with the housing such that the proximity sensor can detect a proximity of a portion of the kingpin assembly that is in the compressed position, wherein the kingpin assembly being in the compressed position is indicative that the outrigger foot is securely in contact with the ground;

a pad assembly secured to the kingpin assembly for contacting the ground.

11. The outrigger of claim 10, wherein the proximity sensor is communicatively coupled with a control system of the utility vehicle such that the utility vehicle will prevent at least one operation of the utility vehicle until the proximity sensor detects that the kingpin assembly is in the compressed state.

12. The outrigger of claim 10, wherein the housing comprises:

a housing body presenting at least one opening for receipt of the kingpin assembly;

a lower plate for preventing the kingpin assembly from moving beyond the compressed position;

an upper plate for preventing the kingpin assembly from moving beyond the uncompressed position, wherein the upper plate and the lower plate secure at least a portion of the kingpin assembly within at least a portion of the housing; and a cap disposed above the upper plate, wherein the proximity sensor is secured within the cap and oriented downward.

13. The outrigger of claim 10, wherein the kingpin assembly includes— a base member;

a kingpin secured to the base member and oriented vertically along a first axis;

a first anti-rotation pin secured to the base member and oriented vertically along a second axis; and a second anti-rotation pin secured to the base member and oriented vertically along a third axis, wherein the first axis, the second axis, and the third axis are all substantially parallel and substantially coplanar, wherein the first anti-rotation pin and the second anti-rotation pin keep the kingpin aligned with the housing.

14. The outrigger of claim 10, further comprising:

a misalignment bearing disposed at least partially within an opening of the kingpin assembly, wherein the misalignment bearing allows the pad assembly to conform to a ground angle, wherein the pad assembly is secured to the kingpin assembly via the opening.

15. A utility vehicle comprising:

a boom assembly for performing a task;

a mobile base;

a plurality of outriggers secured to the mobile base;

an outrigger foot secured to each said outrigger in the plurality of outriggers adapted to ensure a secure emplacement, each outrigger foot including— a housing configured to be secured to the outrigger;

a kingpin assembly at least partially disposed within the housing, said kingpin assembly adapted to be in a compressed position while the outrigger foot is securely in contact with the ground, said kingpin assembly adapted to be in an uncompressed position while the outrigger foot is free of secure contact with the ground;

a proximity sensor associated with the housing such that the proximity sensor can detect a proximity of a portion of the kingpin assembly that is in the compressed position, wherein the kingpin assembly being in the compressed position is indicative that the outrigger foot is securely in contact with the ground; and a pad assembly secured to the kingpin assembly for contacting the ground.

16. The utility vehicle of claim 15, wherein the proximity sensor is communicatively coupled with a control system of the utility vehicle such that the utility vehicle will prevent at least one operation of the utility vehicle until the proximity sensor detects that the kingpin assembly is in the compressed state.

17. The utility vehicle of claim 15, wherein the housing comprises:

a housing body presenting at least one opening for receipt of the kingpin assembly;

a lower plate for preventing the kingpin assembly from moving beyond the compressed position;

an upper plate for preventing the kingpin assembly from moving beyond the uncompressed position, wherein the upper plate and the lower plate secure at least a portion of the kingpin assembly within at least a portion of the housing; and a cap disposed above the upper plate, wherein the proximity sensor is secured within the cap and oriented downward.

18. The utility vehicle of claim 15, wherein the kingpin assembly includes— a base member;

a kingpin secured to the base member and oriented vertically along a first axis;

a first anti-rotation pin secured to the base member and oriented vertically along a second axis; and a second anti-rotation pin secured to the base member and oriented vertically along a third axis, wherein the first axis, the second axis, and the third axis are all substantially parallel and substantially coplanar, wherein the first anti-rotation pin and the second anti-rotation pin keep the kingpin aligned with the housing.

19. The utility vehicle of claim 15, further comprising:

a misalignment bearing disposed at least partially within an opening of the kingpin assembly, wherein the misalignment bearing allows the pad assembly to conform to a ground angle, wherein the pad assembly is secured to the kingpin assembly via the opening.

20. The utility vehicle of claim 15, wherein each of the plurality of outriggers is configured to deploy upon varying ground angles.

* * * * *